INVENTOR
Pierre Margrain

¹United States Patent Office 3,443,145
Patented May 6, 1969

3,443,145
SUPPLY DEVICE FOR AUTOMATIC CONTINUOUS WELDING INSTALLATIONS
Pierre Margrain, Chatenay-Malabry, France, assignor to Etablissements E. Ragonot, Malakoff, France, a body corporate of France
Filed May 12, 1967, Ser. No. 638,083
Claims priority, application France, May 13, 1966, 61,552
Int. Cl. H05b *31/18*
U.S. Cl. 314—69        3 Claims

ABSTRACT OF THE DISCLOSURE

A power supply arrangement for a principal motor pushing electrode wire through a sheath to the work in continuous welding operations and which is connected electrically in parallel with an auxiliary motor drawing the wire at the exit end of the sheath comprises a transistor operating in commutation in the circuit between the two paralleled motors and the supply voltage source and a circuit for connecting the auxiliary motor directly to the supply voltage source during periods when the transistor is blocked, this circuit including a resistor and a diode and there being another diode connected between the collector of the transistor and the auxiliary motor for feeding the auxiliary motor when the transistor is conductive thus bypassing the resistor and the diode connected therewith.

---

The present invention relates most particularly to continuous welding plants in which the welding electrode in the form of a continuous length of wire is pushed through a sheath to the location of the work by means of a principal electric motor, and moreover is also drawn from the wire discharge end of the sheath by means of an auxiliary electric motor rotating at the same speed as the principal motor. With this type of welding installation, the quality of the welding requires that the electrode supply wire be fed to the work at a constant speed regardless of any variation in the frictional drag on the wire as it passes through the sheath.

In the past, one solution to this problem of maintaining a constant feed speed of the electrode wire but which has not been satisfactory is to supply current to the principal and auxiliary electric motors in a parallel circuit arrangement by means of a transistor operating in commutation. The disadvantage of this device, which will be discussed more fully hereinafter with respect to an illustrated embodiment, is that the couple of the auxiliary motor involves a component proportional to its speed of rotation to which is added, in the time intervals when the transistor conducts, a component proportional to the couple of the principal motor. This means that at low speeds, the couple of the auxiliary motor is insufficient to assure constant speed feeding of the supply wire to the work.

The object of the present invention is to overcome the disadvantage of the prior art arrangement. It consists essentially of an electric power supply for the welding wire traction auxiliary motor, in automatic continuous welding installations involving a principal motor pushing the wire at the entrance to a sheath and an auxiliary motor drawing it from the exit end of the sheath, characterized in that the two motors are connected electrically in a parallel circuit and are supplied with current at the "downstream" side of a transistor operating in commutation, there being a resistance connected in parallel with the transistor and isolating diodes provided to supply the auxiliary electric motor directly during the blocking periods of the transistor.

Figure 1:
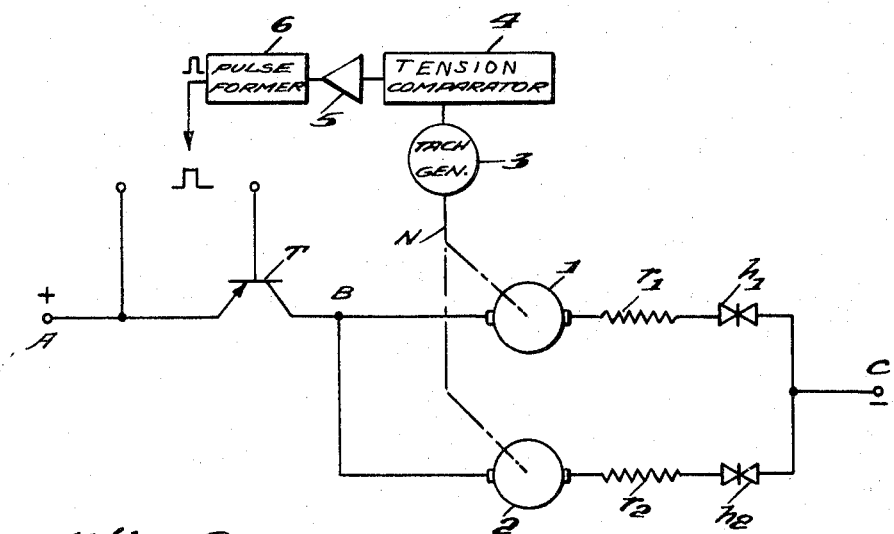
Figure 2:
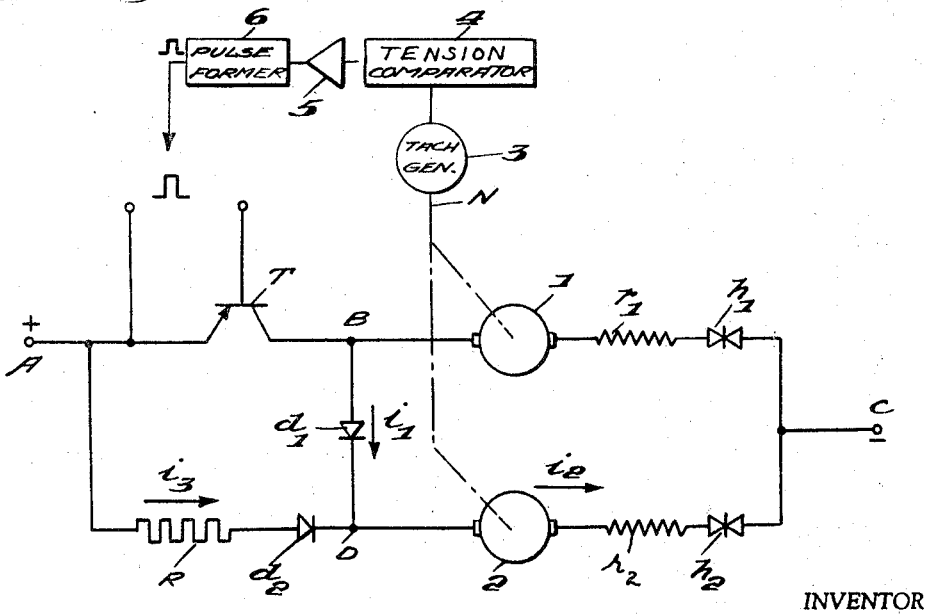

The foregoing object as well as other advantages inherent in the inventive concept will become more apparent from the following detailed description of one suitable, but nonlimiting embodiment thereof and from the accompanying drawings wherein:

FIG. 1 is an electrical schematic diagram of an electrical supply circuit and parallel motor connection according to the prior art previously described; and FIG. 2 is a similar schematic diagram illustrating the present, improved mode of circuit arrangement for the parallel connected motors in accordance with the invention.

With reference now to FIG. 1, the principal electric motor 1 which serves to push the supply of welding wire through the sheath to the work, not illustrated, has a counter-electromotive force $e_1$ and is connected electrically in parallel with the auxiliary electric motor 2 which serves to draw the electrode wire as it emerges from the sheath. The counterelectromotive force of the auxiliary motor is represented by $e_2$. For motor 1, its internal resistance is represented by $r_1$ and the voltage drop at the brushes are represented by $h_1$. In a similar manner, the internal resistance of the auxiliary motor 2 is represented by $r_2$ and the voltage drop at its brushes by $h_2$.

The parallel connected motors 1 and 2 are supplied with current in a continuous manner from a source of direct current indicated by terminals A and C through a transistor T operating in commutation and which is connected in series with the parallel circuit of the two motors. The two motors rotate at the same speed N which is determined by the speed at which the supply of electrode wire unwinds.

Variations in running speed of the two motors are detected by a device, known in itself, consisting of a tachometer generator 3, a tension comparator 4, an amplifier 5 connected to the output of the tension comparator, and a control circuit 6 connected to the amplifier output which delivers a rectangular output control signal pulse between the emitter and base of the transistor, the supply circuit to the parallel connected motors being connected in the emitter-collector circuit of this transistor.

Operation of the arrangement according to FIG. 1 can be analyzed as a function of the state of transistor T.

(a) *Transistor T blocked*

Under this condition, the principal motor 1 functions as a generator and supplies the auxiliary motor 2 with electrical power, the intensity of the loop circuit containing the two motors being:

$$i = \frac{e_1 - (e_2 + h_1 + h_2)}{r_1 + r_2}$$

i.e., as $h_1$ and $h_2$ are negligible as compared to $e_1$ and $e_2$, and since $e_1$ and $e_2$ are proportional to the magnetic flux $\phi$ and to the speed N, $$i = \frac{k_1\phi_1 - k_2\phi_2}{r_1 + r_2}N$$

Now the couple $C_2$ of motor 2 is proportional to $i$ and to the magnetic flux $\phi$ and thus one has the relation:

$$C_2 = KN$$

where K is a constant.

The couple being proportional to the speed of unwinding of the electrode wire, is subject to irregularities which are detrimental to good welding quality.

(b) *Transistor conductive to saturation*

The supply voltage U is then applied to the two motors 1 and 2 in parallel, and by eliminating U, one obtains (neglecting $h_1$ and $h_2$), a value for the couple of motor 2 in accordance with the equation:

$$C_2 = K'N + K''I_1$$

wherein: $K'$ and $K''$ are constants and $I_1$ is the value of the current in the principal motor 1.

The couple $C_2$ is therefore constituted by a term proportional to the speed N, and by a term proportional to the current in motor 1, i.e., proportional to the motor couple of motor 1.

The disadvantages of such an arrangement are avoided by the improved circuit arrangement according to this invention, one embodiment of which is illustrated in FIG. 2. With reference to this view, in which corresponding components have been designated with the same reference symbols, it will be seen that the principal, wire pushing motor 1 is connected between the terminals A and C of the supply source of direct current through the emitter-collector circuit of transistor T. The auxiliary, wire pulling motor 2, is also connected between the supply source terminals A and C through a resistance R series connected to a diode $d_2$. In addition, a diode $d_1$ is connected between a tap point B in the circuit between the collector of transistor T and motor 1 and a tap point D in the circuit between diode $d_2$ and motor 2, the resistance R being located in the circuit between diode $d_2$ and the power supply terminal A.

If the currents in circuit branches BD, DC and AD are represented respectively by $i_1$, $i_2$ and $i_3$ one obtains, when transistor T is blocked, the relationship:

$$i_2 = i_1 + i_3$$

since motor 1 functions as a generator and the supply voltage U is applied to circuit branch ADC.

The voltage drops in diodes $d_1$ and $d_2$, as well as at the level of the motor brushes being negligible, one obtains for $i_1$ the same value as for the previous case, i.e., $$i_1 = \frac{k_1\phi_1 - k_2\phi_2}{r_1 + r_2} N$$

On the other hand, one has the relationship $$i_3 = \frac{U_{AD}}{R} = \frac{U - (e_1 - r_1 i_1)}{R}$$

from which one obtains for $i_2$ the relationship $$i_2 = \frac{U}{R} - AN$$

with A equal to $$A = \frac{k_1\phi_1 - k_2\phi_2}{r_1 + r_2}\left(1 + \frac{r_1}{R}\right) - \frac{k_1\phi_1}{R}$$

One thus obtains a motor couple including a fixed component $U/R$ and a component proportional to the motor speed which may be cancelled by adjusting the value of R. The condition for cancellation of the factor A leads to the relationship $$R(k_1\phi_1 - k_2\phi_2) = r_2 k_1\phi + r_1 k_2\phi_2$$

By construction, one has, in the type of motor used for the electrode wire feed circuit according to the invention, substantially the relationship $$k_1\phi_1 = 2k_2\phi_2$$

from which one, deduces $$R = 2r_2 + r_1$$

That is to say, since in general $r_1$ is much smaller than $r_2$ $$R = 2r_2$$

If one assigns, by construction, to R the value $2r_2$, one can obtain with the improved arrangement according to FIG. 2 a couple for the auxiliary motor 2 equal to a constant value $U/R$. It is to be understood that the couple, taking into account the quantities neglected in the computation, does not have this value exactly but that this value is substantially independent of the motor speed.

The case of the unblocked transistor is similar to that analyzed above, the resistance R then being shunted by transistor T.

In conclusion, the improved electrical supply circuit for the paralleled motors is particularly applicable for supplying auxiliary, traction motors in the feed of electrode wire for continuous welding plants, but it is desired to point out that it may have other applications.

I claim:
1. In a power supply arrangement, particularly for supplying a wire traction auxiliary motor in automatic continuous welding operations comprising a principal motor pushing electrode wire through a sheath to the work, and an auxiliary motor drawing the wire at the exit end of the sheath, the two motors being connected electrically in parallel downstream of a transistor operating in commutation, the improvement wherein a resistance is connected in parallel with said transistor and isolating diodes are provided in the circuit to supply said auxiliary motor directly from the source of power to which said transistor is connected during the periods when said transistor is blocked.

2. A power supply arrangement as defined in claim 1 wherein said resistance has a value substantially twice that of the internal resistance of said auxiliary motor.

3. A power supply arrangement as defined in claim 1 wherein said principal motor is connected to the power supply through the emitter-collector circuit of said transistor, wherein said auxiliarly motor is connected to the power supply through a series connection of said resistance and a first diode, and wherein a second diode is connected directly between said motors between a tap point at the collector side of said transistor and a tap point at the downstream side of said first diode.

References Cited
UNITED STATES PATENTS 3,293,477 12/1966 Lobosco _____ 314—69
3,344,305 9/1967 Ogden et al. _____ 219—130 X BERNARD A. GILHEANY, *Primary Examiner.*

R. N. ENVALL, JR., *Assistant Examiner.*

U.S. Cl. X.R.

219—130; 318—7